Dec. 22, 1931.   S. S. MATTHES   1,837,460

CONDUCTOR SUPPORT

Filed May 25, 1931

WITNESS:
H. J. Stromberger

Inventor
SAMUEL S. MATTHES
By
Attorney

Patented Dec. 22, 1931

1,837,460

UNITED STATES PATENT OFFICE

SAMUEL S. MATTHES, OF MANSFIELD, OHIO, ASSIGNOR TO THE OHIO BRASS COMPANY, OF MANSFIELD, OHIO, A CORPORATION OF NEW JERSEY

CONDUCTOR SUPPORT

Application filed May 25, 1931. Serial No. 539,703.

My invention relates to conductor supports and particularly for supporting conductors for conveying electric current to moving vehicles.

The object of my invention is to provide supporting devices which are simple in construction, light in weight, easy of installation, durable and efficient.

My invention resides in the new and novel construction, combination and relation of the parts hereinafter described and shown in the accompanying drawings.

In the drawings:—

Figure 1:
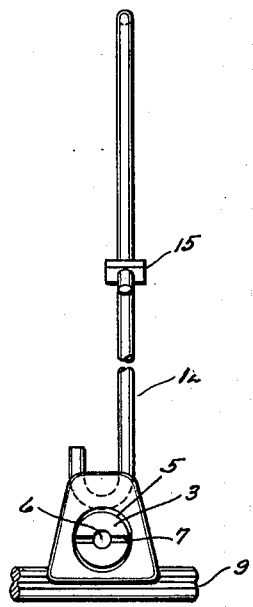
Fig. 1 is a side view of one form of my invention for straight line construction.
Figure 2:
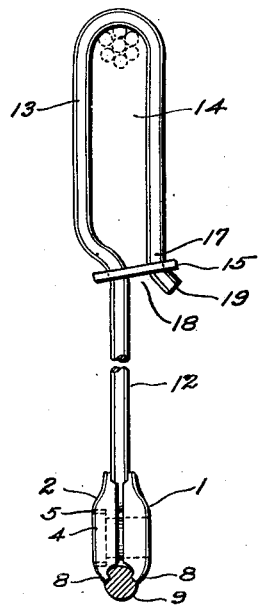
Fig. 2 is an edge view of Fig. 1.

In Figs. 1 and 2 I employ two clamping members held in clamping position by means of the hollow screw 3 which has a threaded connection with the member 1 and a flanged head 4 which sets into a recess 5 in the member 2. The screw is provided with a passage 6 therethrough which may be round or polygonal sided and a transverse slot 7. If the passage 6 is polygonal sided I do not as a rule provide the screw with the slot 7.

The members 1 and 2 are provided with lips 8 to receive and grip the trolley conductor 9. The members 1 and 2 are also each provided with a curved groove 10 and the interior bosses 11. When the members 1 and 2 are positioned together the grooves 10 form a complete channel and the members 11 form abutments for receiving and supporting the suspension rod 12.

The grooves 10 are preferably semi-circular and the end of the rods 12 are bent to a semi-circle to fit the grooves 10.

From this it will be seen that when the clamps 1 and 2 and rod 12 are assembled and the trolley wire 9 in position that the screw 3 will draw the parts together and in close clamping engagement with the trolley wire 9 and hold them in that relation.

The upper end of the rod 12 is provided with a portion 13 which is bent back upon itself forming an open end loop 14 and which is held closed or substantially closed by a lock member 15 which is a piece of sheet metal with a slot 16 therein wide enough to receive the rod and long enough to take in the end 17 of the rod. It will be evident that by merely closing the opening 18 by hand that the lock member 15 can be disengaged from the end 17.

This rod construction makes it very simple to apply the device to a messenger cable for supporting the same and the lock member 15 when placed in position prevents accidental disengagement of the device from the supporting cable and the bent portion 19 prevents the lock 15 from being displaced.

Figure 3:
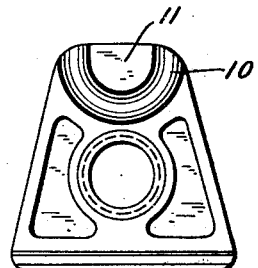
Fig. 3 is an interior face view of one of the clamping members shown in Figs. 1 and 2.
Figure 5:
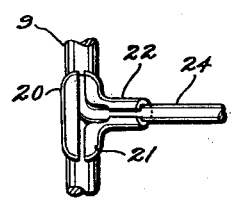
Fig. 5 is a top view of the clamping portion of Fig. 4.
Figure 4:
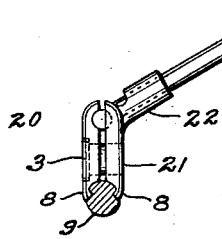
Fig. 4 is another form of my invention for curve construction.
Figures 6, 7:
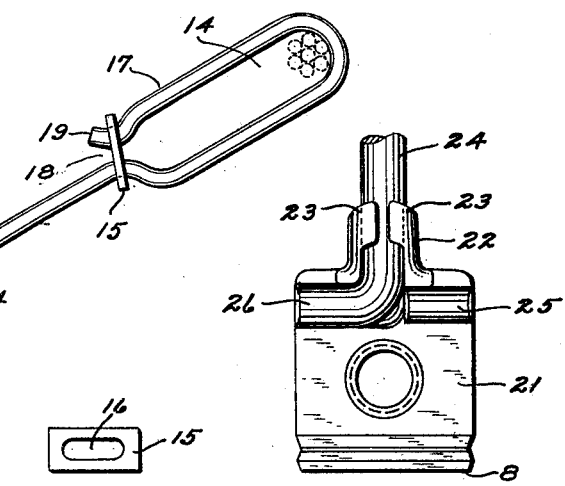
Fig. 6 is an interior face view of one of the clamping members shown in Fig. 4 with a portion of the support rod in position.
Fig. 7 is a top view of a locking device.

The device shown in Figs. 1, 2 and 3 is intended for supporting the trolley wire on tangency, but on curves, where the supporting and trolley wires are offset, I employ the device shown in Fig. 4.

In Fig. 4 I employ clamp members 20 and 21 which are held together by a screw 3 as in the previous form and each member 20 and 21 having lips 8 to grip the trolley wire 9. The member 21 is provided with a laterally projecting boss 22 having lips 23 preferably cast open to form a groove in which may be positioned the rod 24 and the lips 23 are then closed into engagement with the rod 24. The member 21 is also provided with a longitudinal groove 25 to receive the bent end 26 of the rod 24. By means of the boss 22 and the end 26, the rod 24 will be held rigidly in position with respect to the member 21 when the member 20 is clamped in position by means of the screw 3. The angle made by the longitudinal axis of the rod 24 may be varied to meet various conditions in order to hold the clamping member vertical.

The end of the rod 24 is also provided with an open loop 14 which can be closed by means of the locking member 15.

The device is installed by moving the locking member 15 out of locking position and allowing the opening 18 to enlarge such that the loop end of the rod may be placed over a messenger cable passing through the opening 18. The parts 13 and 17 are then sprung together and the lock member 15 replaced as shown in Figs. 1 and 2.

The screw 3 is then loosened permitting the jaws 8 to receive the trolley 9 and the screw is then tightened into position drawing the members 1 and 2 toward each other into clamping engagement with the trolley wire 9 and the support rod 12 or 24

If the screw 3 is provided with a polygonal passage, then a wrench-like tool having a part with a like number of sides is inserted into the passage for operating the screw, but if the screw has a round passage 6 and a slot 7 then an ordinary type of screw driver may be employed or it may have in addition to the blade a projection thereon to be inserted into the passage 6 thereby acting as a guide and preventing the blade of the screw driver from slipping out of the slot 6.

There are many modifications which will suggest themselves to those skilled in the art, but I wish to be limited only by my claims.

I claim:—

1. A conductor support comprising a pair of clamping members and each having means along one edge to engage and grip a conductor and holding means at the opposite edge to receive and grip a hanger member, a hanger member having means at one end to be positioned between the clamping members and in said holding means and a loop at the other end to receive a suspension, an opening to said loop through which the suspension may be passed into said loop and means to close the said opening when the suspension has been positioned within the loop and a screw to hold the clamping members together and in clamping engagement with the hanger member and conductor.

2. A conductor support comprising a pair of clamping members and each having conductor engaging means at one edge and grooved means at the other end to receive a hanger member, a hanger member having a bight at one end positioned in the grooved means and a loop at the other end and an opening to said loop and means to close or open the opening to the loop at will and a screw having a passage therein and means to receive a tool to rotate the screw, the screw co-operating with the clamping members to draw the clamping members together and hold them in engagement with the said bight and conductor.

3. A conductor support comprising a pair of clamping members each having means to grip a conductor, a hanger member non-detachably secured to one of the members, means projecting laterally from one member to receive the hanger member and hold it in a laterally projecting and fixed relation to the members, the hanger provided with a loop and an opening thereto and means to close or open the opening to the loop at will, means on the hanger co-operating with the clamping members to prevent the hanger member rotating relative to the said members and a screw to hold the said members together in clamping engagement with the conductor the screw having an opening to receive a tool and means on the screw to lock with the tool to rotate the screw.

4. A conductor support comprising a pair of clamping members each having means to grip a conductor, a hanger member non-detachably secured to one of the members, means projecting laterally from one member to receive the hanger member and hold it in a laterally projecting and fixed relation to the members, the hanger member provided with a loop having an opening thereto and means to close and maintain the opening closed at will and a screw provided with an opening to receive a tool to cooperate with the screw to rotate the screw to hold the said members together in clamping engagement with the conductor.

5. A conductor support comprising a pair of clamping members each having means to grip a conductor, a hanger member non-detachably secured to one of the members, means projecting laterally from one member to receive the hanger member and hold it in a laterally projecting and fixed relation to the members, the hanger provided with a loop having an opening thereto and means to close the opening at will, means on the hanger co-operating with the clamping members to prevent the hanger member rotating relative to the said members and a screw having an axial opening and means to receive a tool by which the screw is rotated to hold the said members together in clamping engagement with the conductor and having means to receive a tool to rotate the screw.

In testimony whereof I affix my signature.

SAMUEL S. MATTHES